US008977538B2

(12) United States Patent
Salisbury

(10) Patent No.: US 8,977,538 B2
(45) Date of Patent: Mar. 10, 2015

(54) CONSTRUCTING AND ANALYZING A WORD GRAPH

(76) Inventor: Richard Salisbury, Round Rock, TX (US)

(*) Notice: Subject to any disclaimer, the term of this patent is extended or adjusted under 35 U.S.C. 154(b) by 265 days.

(21) Appl. No.: 13/230,643

(22) Filed: Sep. 12, 2011

(65) Prior Publication Data

US 2012/0065959 A1 Mar. 15, 2012

Related U.S. Application Data

(60) Provisional application No. 61/382,028, filed on Sep. 13, 2010.

(51) Int. Cl.
*G06F 17/27* (2006.01)

(52) U.S. Cl.
CPC .................. *G06F 17/2705* (2013.01)
USPC ............................................................. 704/9

(58) Field of Classification Search
CPC ... G06F 17/21; G06F 17/277; G06F 17/2705; G06F 17/2755
USPC ............................................... 704/277, 1–10
See application file for complete search history.

(56) References Cited

U.S. PATENT DOCUMENTS

| | | | | |
|---|---|---|---|---|
| 5,268,840 A | * | 12/1993 | Chang et al. ...................... | 704/9 |
| 5,293,314 A | * | 3/1994 | Sakai ............................ | 715/201 |
| 5,652,898 A | * | 7/1997 | Kaji ................................ | 704/10 |
| 5,802,533 A | * | 9/1998 | Walker .......................... | 715/201 |
| 5,806,021 A | * | 9/1998 | Chen et al. ........................ | 704/9 |
| 5,873,056 A | | 2/1999 | Liddy et al. | |
| 6,052,657 A | * | 4/2000 | Yamron et al. ..................... | 704/9 |
| 6,112,203 A | | 8/2000 | Bharat et al. | |
| 6,285,999 B1 | | 9/2001 | Page | |
| 6,374,210 B1 | | 4/2002 | Chu | |
| 6,640,006 B2 | * | 10/2003 | Wu et al. ........................ | 382/177 |
| 6,721,697 B1 | * | 4/2004 | Duan et al. ........................ | 704/9 |
| 6,810,375 B1 | * | 10/2004 | Ejerhed ........................... | 704/9 |
| 7,383,169 B1 | * | 6/2008 | Vanderwende et al. ........... | 704/9 |
| 7,430,504 B2 | | 9/2008 | Vanderwende et al. | |
| 7,542,893 B2 | * | 6/2009 | Cancedda et al. ................ | 704/2 |
| 7,603,651 B2 | | 10/2009 | De Brabander | |
| 7,809,548 B2 | | 10/2010 | Mihalcea et al. | |
| 7,873,509 B1 | | 1/2011 | Budzinski | |
| 2005/0108630 A1 | * | 5/2005 | Wasson et al. ................ | 715/513 |
| 2006/0188162 A1 | * | 8/2006 | Szilagyi et al. ............... | 382/226 |
| 2009/0259459 A1 | * | 10/2009 | Ceusters et al. .................. | 704/9 |
| 2009/0327279 A1 | | 12/2009 | Adachi et al. | |

(Continued)

FOREIGN PATENT DOCUMENTS

JP 6332935 12/1994
WO 2007007702 1/2007

OTHER PUBLICATIONS

Phrase-based Document Similarity Based on an Index Graph Model Khaled M. Harnmouda Mohamed S. Kamel, 2002 IEEE.*

(Continued)

*Primary Examiner* — Jialong He
(74) *Attorney, Agent, or Firm* — Superior IP, PLLC; Dustin L. Call

(57) ABSTRACT

One example embodiment includes a method for constructing a word graph. The method includes obtaining a subject text and dividing the subject text into one or more units. The method also includes dividing the units into one or more sub-units and recording each of the one or more sub-units.

20 Claims, 9 Drawing Sheets

(56) References Cited

U.S. PATENT DOCUMENTS

2010/0063795 A1* 3/2010 Sakao et al. ............... 704/9
2011/0270604 A1* 11/2011 Qi et al. ..................... 704/9

OTHER PUBLICATIONS

"TextRank: Bringing Order into Texts" Rada Mihalcea and Paul Tarau, Proceedings of EMNLP, 2004.*

"Towards an Iterative Reinforcement Approach for Simultaneous Document Summarization and Keyword Extraction" Xiaojun Wan, Jianwu Yang, Jianguo Xiao, Proceedings of the 45th Annual Meeting of the Association of Computational Linguistics, pp. 552-559, Prague, Czech Republic, Jun. 2007.*

Matsuo, "Graph-based Word Clustering using a Web Search Engine", Proceedings of the 2006 Conference on Empirical Methods in Natural Language Processing (EMNLP 2006), pp. 542-550.*

* cited by examiner

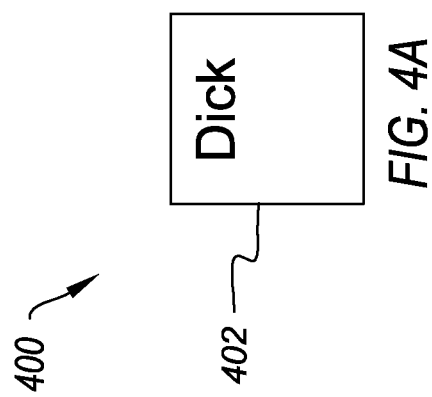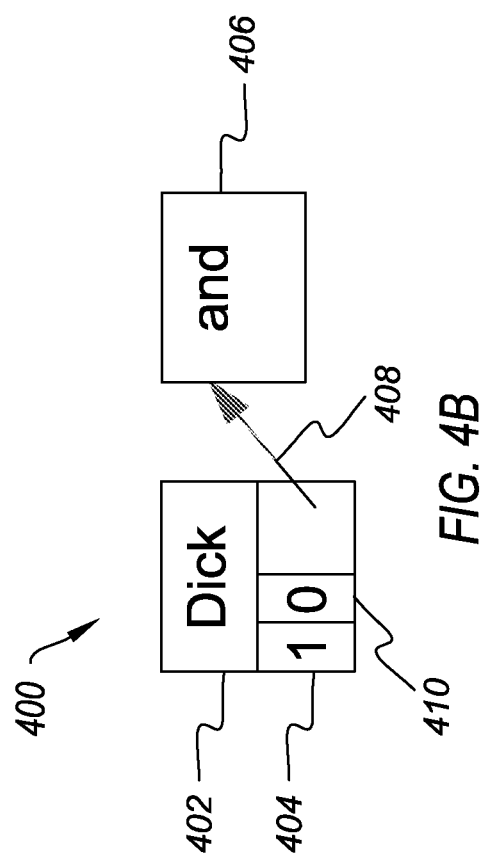

CONSTRUCTING AND ANALYZING A WORD GRAPH

CROSS-REFERENCE TO RELATED APPLICATIONS

This application claims the benefit of and priority to U.S. Provisional Patent Application Ser. No. 61/382,028 filed on Sep. 13, 2010, which application is incorporated herein by reference in its entirety.

BACKGROUND OF THE INVENTION

Computer analysis of written texts is an extremely difficult endeavor. Grammar rules tend to have many exceptions, some of which follow their own rules and some of which are arbitrary. Therefore, computer analysis tends to ignore grammar and focus instead on character order. I.e., it is limited to text recognition which attempts to determine which characters form the text and then compiles a text document which includes the characters produced.

A problem with this approach is that characters that are similar to one another can be confused. In particular, the text recognition cannot differentiate between characters that have very little, or no, differences. For example uppercase "I" and 1 are often confused by text recognition software. This is because the text recognition software is simply looking at the character individually, and not in the proper context.

Text recognition can try to "anticipate" what a character should be. However, to do so it relies on grammar rules. However, as previously noted grammar rules may have significant numbers or exceptions. In addition, the author may have used incorrect grammar so any anticipation of character in context is necessarily limited by the high probability of introducing errors.

Even if the text characters are known, such as in text files for example, a grammatical analysis can be difficult. Authors are not constrained to write text which is grammatically correct. Alternatively, different authors or groups of authors may have different standards for what is grammatically correct. In addition, some text may make sense to human readers but is not capable of being interpreted by a computer. The text can include abbreviations, words that include numbers or have any other number of complicating factors.

Accordingly, there is a need in the art for a way to analyze text. Additionally, there is a need in the art for the text analysis to proceed whether or not the text is grammatically correct. Further, there is a need in the art for a way to anticipate text. In addition, there is a need in the art for the anticipated text to be available to assist in character recognition. Moreover, there is a need in the art for the anticipated text to be available to assist in the composition of text.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a method for constructing a word graph. The method includes obtaining a subject text and dividing the subject text into one or more units. The method also includes dividing the units into one or more sub-units and recording each of the one or more sub-units.

Another example embodiment includes a method for producing a word graph. The method includes dividing a subject text into one or more sentences. The method also includes assigning an identifier to each of the one or more sentences. The identifier is unique for each of the one or more sentences and identifies the occurrence of each of the one or more sentences within the subject text. The method further includes dividing the each of the one or more sentences into one or more words. The method additionally includes processing the words. Processing the words includes identifying the first word in each of the one or more sentences in a first word index and determining the relative placement of each word in each of the one or more sentences.

Another example embodiment includes a word graph for storing a subject text, wherein the subject text is divided into sentences and the sentences are further divided into words. The word graph includes one or more nodes, wherein each of the one or more nodes includes a word from a subject text. The word graph also includes a repeat factor, wherein the repeat factor indicates the number of instances in which one or more repeated words have been encountered in a sentence of the subject text. The word graph further includes a sentence identifier, wherein the sentence identifier identifies the sentence in the subject text. The word graph additionally includes a link between two words. The two words include a first node storing a first word and a second node storing a second word, wherein the second word is the word immediately following the first word in at least one location in the subject text. The link points from the first node to the second node.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrative embodiments of the invention and are therefore not to be considered limiting of its scope. The invention will be described and explained with additional specificity and detail through the use of the accompanying drawings in which:

FIG. 4A illustrates an example of adding a first sub-unit of a unit to a word graph;

FIG. 4B illustrates an example of adding the second sub-unit of the unit to the word graph;

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
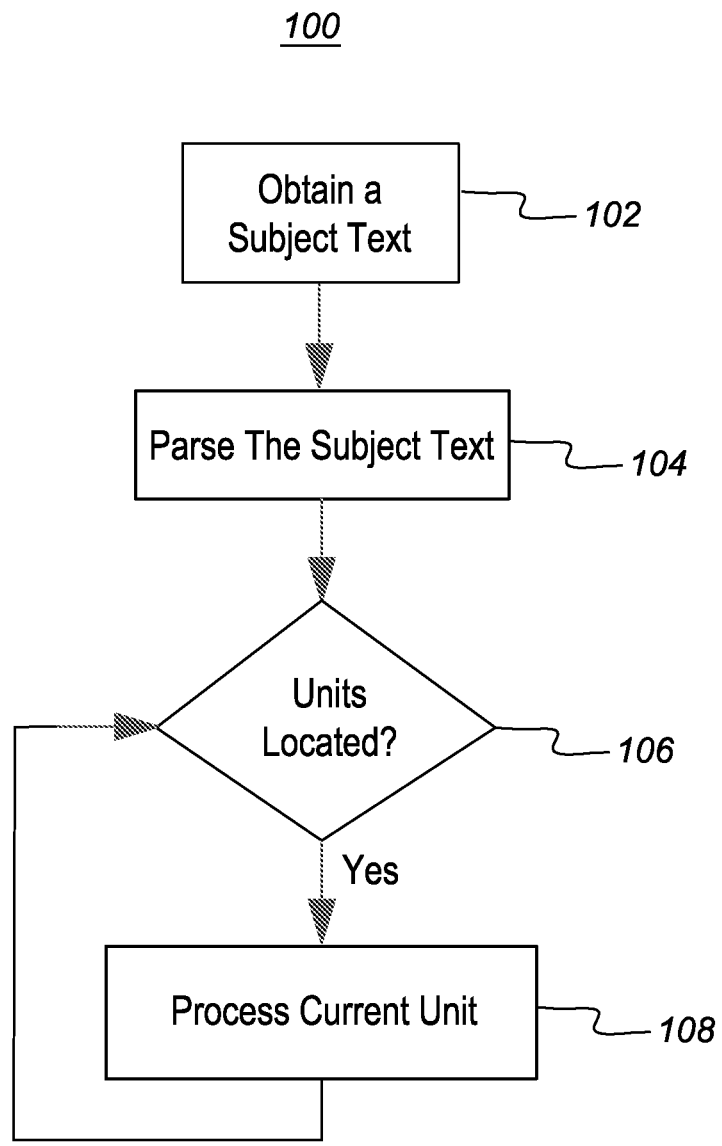
FIG. 1 illustrates an example of a method for creating a word graph.

FIG. 1 illustrates an example of a method 100 for creating a word graph. In at least one implementation, the word graph can represent the sub-units from a set of natural language units or other syntactic units. The units can be in the English language or any other language. The word graph can preserve and reflect the order of the sub-units in the units at a unit-by-unit level. I.e., the word graph can include a data structure that is an innovative variation of a more general data structure commonly referred to as a "graph." A unit of text is loaded into the word graph by parsing it one sub-unit at a time in the same order as a human reader would (left-to-right in many languages, such as English).

Once loaded with one or more units, the word graph contains information about the units, their constituent sub-units and various relationships between them that can be extracted and/or analyzed for any number of useful purposes. Some of these include the following.

Comparison of an Example Unit

Given a example unit (one not already loaded in the word graph, whether grammatically "correct" or not), the word graph can be iterated and analyzed to identify one or more units loaded in the word graph that most closely correspond to the example unit. In addition to tracking the total number of sub-units in common, the word graph allows for other comparison criteria. This includes a comparison that factors in the relative sub-unit order of common sub-units. Such a comparison can be performed on multiple loaded units, and a matching score assigned to each. Additionally or alternatively, the comparison and scoring process can be further refined by consideration of authorship and/or other source information of the one or more loaded units to which the example unit is compared. One way that this can be accomplished is through the assignment of a unique identifier to one or more units and maintenance of an index that associates each such unique identifier with authorship and/or other source information with respect to each of the one or more such units.

Text Search Using Example Unit Comparison

Example unit comparison can be used to perform a text search against the word graph to identify matching loaded units that might not otherwise be identified—or might be assigned a different or lower relevance or hit rate—through a search examining only search terms (without consideration of sub-unit order). This process can be performed either as a complete search in itself or as a second step applied to the results of a primary search-terms search. In the latter case, a word graph is loaded with units that are returned as hits in the first-step search. Additionally or alternatively, the search process can be further refined by consideration of authorship and/or other source information of the one or more loaded units to which the example unit is compared. One way that this can be accomplished is through the assignment of a unique identifier to one or more units and maintenance of an index that associates each such unique identifier with authorship and/or other source information with respect to each of the one or more such units.

Automated Proof-Reading Using Example Unit Comparison

Using example unit comparison, a example unit can be validated against a word graph loaded with units that are known to have already been adequately proof-read or otherwise reviewed or approved by an author, editor or other reviewer. The example unit can be compared to one or more loaded units that most closely match it (based on given match criteria). If the example unit matches one of these loaded units, then the example unit is ipso facto considered to be proof-read (given the premise that all units in the word graph are known to have already been adequately proof-read). If it does not, further comparison can be made to determine portions of the example unit that differ from the loaded units and may therefore be in error. This process can be repeated for each unit in a particular text to be proof-read. Additionally or alternatively, this process can be further refined by consideration of authorship and/or other source information of the one or more loaded units to which the example unit is compared. One example of this could be a situation where a particular unit might be considered to be in error for one author but not another author. I.e. the automated proofreading process can make allowance for the idiosyncrasies of one or more individual authors or groups of authors. One way that this can be accomplished is through the assignment of a unique identifier to one or more units and maintenance of an index that associates each such unique identifier with authorship and/or other source information with respect to each of the one or more such units.

Improved Blackline Comparison Using Example Unit Comparison

A computer blacklining text comparison program can use example unit comparison to more accurately identify units or other text regions in two or more different documents that are related. This can improve the tracking of subtle changes to a text over successive generations of edits.

Next Sub-Unit and Rest of Unit Prediction Using Example Unit Comparison

Using example unit comparison and given a example unit fragment, it is possible to analyze the word graph to determine which sub-unit is statistically most likely to follow (or a list of possible next sub-units with their respective statistical likelihoods). This process can then be repeated if desired to predict subsequent sub-units in addition to the immediately following one. Additionally or alternatively, this process can be further refined by consideration of authorship and/or other source information of the one or more loaded units to which the example unit is compared. One way that this can be accomplished is through the assignment of a unique identifier to one or more units and maintenance of an index that associates each such unique identifier with authorship and/or other source information with respect to each of the one or more such units.

Predictive Drafting Assistance Through Next Sub-Unit Prediction and Rest of Unit Prediction Next sub-unit prediction and rest of unit prediction can be used to assist in auto-completion of a unit that an author is drafting in real time. As the author drafts the unit, next sub-unit prediction and rest of unit prediction can be used to suggest additional sub-unit(s) in real time. This prediction process can be made more accurate by using a word graph containing units previously drafted by this same author (assuming the author's style is consistent).

Increasing Accuracy of Speech Recognition Through Next Sub-Unit Prediction and Rest of Unit Prediction Predictive drafting assistance can be used to increase the accuracy of speech recognition where a unit author is "drafting" a unit by dictating it aloud to a speech recognition computer program. In choosing among different possible sub-units that such a program might "think" it heard from the author, predictive drafting assistance can be used to determine which ones are statistically most likely. This prediction process can be made more accurate if the author style consistency principle obtains.

FIG. 1 shows that the method includes obtaining 102 a subject text. In at least one implementation, the subject text can be obtained 102 from any desired source. For example, the subject text can include existing text, such as books, newspapers, magazines, journals, articles, web pages or other printed or electronic text, or newly created text such as text being created in real time by a user. Additionally or alternatively, the subject text can include model text used for compiling proofread materials.

FIG. 1 also shows that the method 100 can include parsing 104 the subject text. In at least one implementation, parsing 104 the subject text can include dividing the subject text into any desired units. For example, parsing 104 the subject text can include dividing the text into chapters, sections, paragraphs, sentences, phrases, words, lines, class of words, phrase types or any other desired division. Class of words can include the word type, such as noun, verb, object, subject, article, preposition, etc.

FIG. 1 further shows that the method 100 can include determining 106 whether any units have been located. In at least one implementation, determining 106 whether any units have been located can include determining whether units remain to be placed in the word graph. I.e., the units can be placed in a queue or other location where they are stored until they are to be placed within the word graph. Additionally or alternatively, the units can be parsed and placed in the word graph until the end of the subject text.

FIG. 1 additionally shows that the method 100 can include processing 108 the current unit. In at least one implementation, processing 108 the current unit can include placing the current unit in the word graph. Additionally or alternatively, processing 108 the current unit can include analyzing the relationship of the current unit to other units. I.e., the placement of the current unit in the subject text relative to other units can be analyzed and stored as well, as described below.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2:
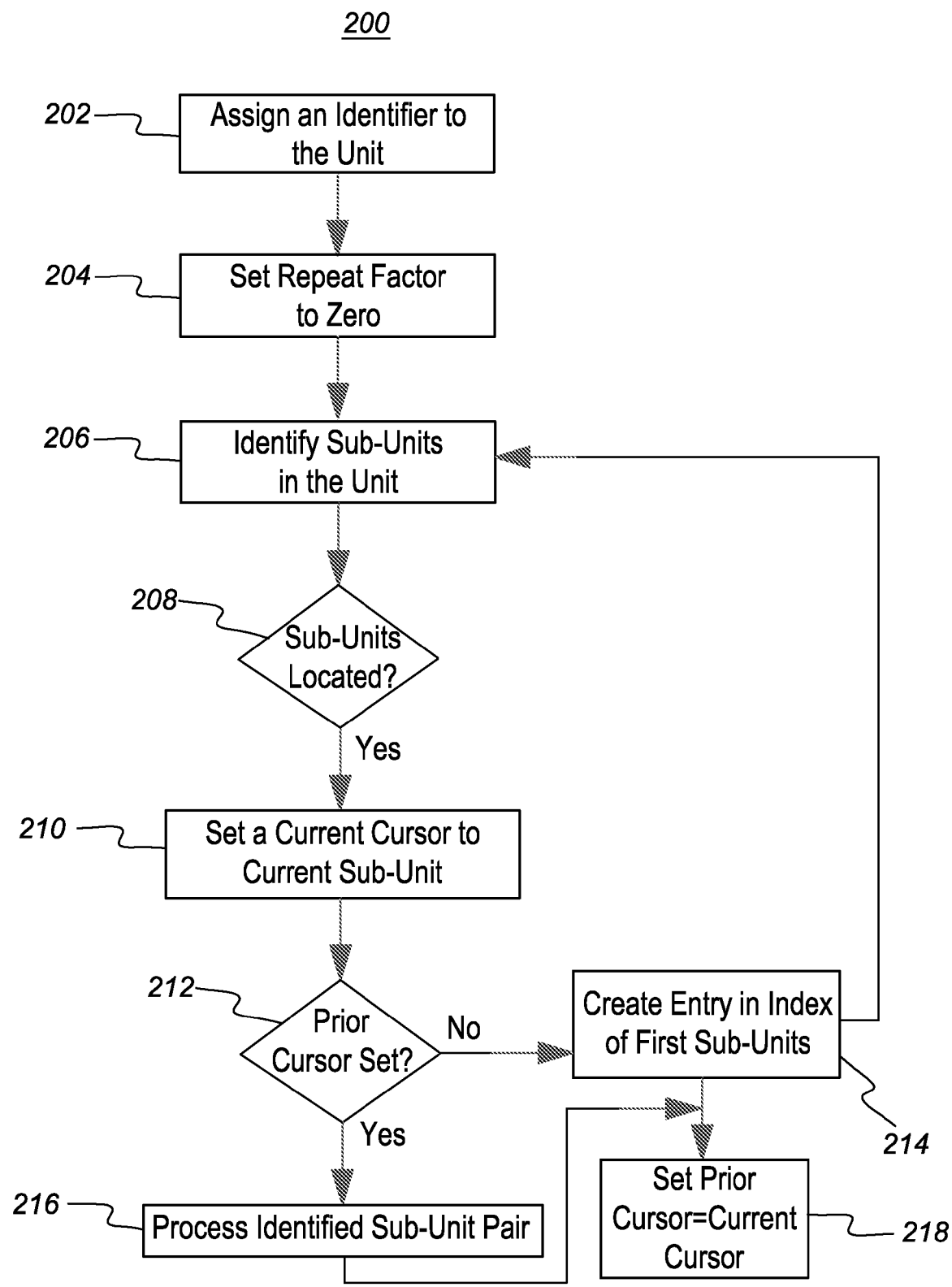
FIG. 2 illustrates an example of a method for processing a sub-unit.

FIG. 2 illustrates an example of a method 200 for processing a unit. In at least one implementation, processing the unit can include determining the structure of the unit. In particular, processing the unit can include analyzing the relationship of constituent sub-units. The relationship of the sub-units can be preserved for analysis, as described above.

FIG. 2 shows that the method 200 includes assigning 202 an identifier to the unit. In at least one implementation, the identifier can be any label which identifies the unit. For example, the identifier can be a tag or number assigned to the unit. Additionally or alternatively, the identifier can include the memory address within a digital medium of the beginning character of the unit.

As used herein, the word unit shall mean a first portion of the subject text. One of skill in the art will appreciate that although a unit can include a sentence as commonly used (i.e., a grammatical unit consisting of a word or a group of words that is separate from any other grammatical construction) it can also include other portions of the subject text such as a chapters, sections, paragraphs, phrases, words, lines, word or phrase types, part of speech, morphemes, syllables, punctuation marks, numbers, characters, symbols or any other desired division of the subject text.

FIG. 2 further shows that the method 200 can include setting 204 a repeat factor to zero. In at least one implementation, the repeat factor can indicate the number of instances in which one or more repeated sub-units have been encountered in the unit. In particular, the repeat factor can allow the correct occurrence of the repeated sub-unit to be identified, as described below.

FIG. 2 also shows that the method 200 can include identifying 206 sub-units in the unit. In at least one implementation, the sub-unit can include any sub-unit of the unit which is to be analyzed in the word graph. I.e., a sub-unit can include a unique entry to be analyzed within the word graph. For example, a sub-unit can include chapters, sections, paragraphs, sentences, phrases, words, lines, word or phrase types, part of speech, morphemes, syllables, punctuation marks, numbers, characters, symbols or any other desired division of the subject text.

FIG. 2 additionally shows that the method 200 can include determining 208 whether any sub-units remain to be processed. In at least one implementation, determining 206 whether any sub-units remain to be processed can include determining when the end of the unit has been reached. For example, the unit may include only a single sub-unit or multiple sub-units. Each sub-unit can be analyzed in turn, as described below.

FIG. 2 also shows that the method can include setting 210 a current cursor to the current sub-unit. In at least one implementation, the current cursor can indicate the sub-unit to be processed. For example, the current cursor can include a pointer which identifies the sub-unit being processed.

FIG. 2 further shows that the method 200 can include determining 212 whether a prior cursor has been set. In at least one implementation, the prior cursor can identify the sub-unit immediately preceding the current sub-unit. In particular, the prior cursor can point to the sub-unit prior to the current sub-unit in the unit being analyzed. If the prior cursor has not been set, that is an indication that the sub-unit being analyzed is the first sub-unit in the unit. In contrast, if the prior cursor has been set, that is an indication that the sub-unit being analyzed is not the first sub-unit in the unit. This distinction can be captured, as described below.

FIG. 2 additionally shows that the method 200 can include creating 214 an entry in the index of first sub-units if the prior cursor is not set. In at least one implementation, the entry can link the unit identifier to the first sub-unit. I.e., the unit identifier can point to the first sub-unit in the unit. The unit identifier can be changed to include the value of the current cursor, which is pointing to the first sub-unit, or can include any other method of indicating the first sub-unit of the unit.

FIG. 2 also shows that the method 200 can include processing 216 the identified sub-unit pair if the prior cursor is set. In at least one implementation, the sub-unit pair is the current sub-unit and the prior sub-unit. I.e., the sub-unit pair to be processed 216 are the sub-units identified by the prior cursor and the current cursor.

FIG. 2 further shows that the method 200 can include setting 218 the prior cursor to the current cursor. In at least one implementation, setting 218 the prior cursor to the current cursor can include copying the value of the current cursor to the prior cursor. In particular, the prior cursor and the current cursor will be indicating the same entry in preparation for the processing of the next sub-unit pair. I.e., the next sub-unit pair can include the current sub-unit and the sub-unit following the current sub-unit.

Figure 3:
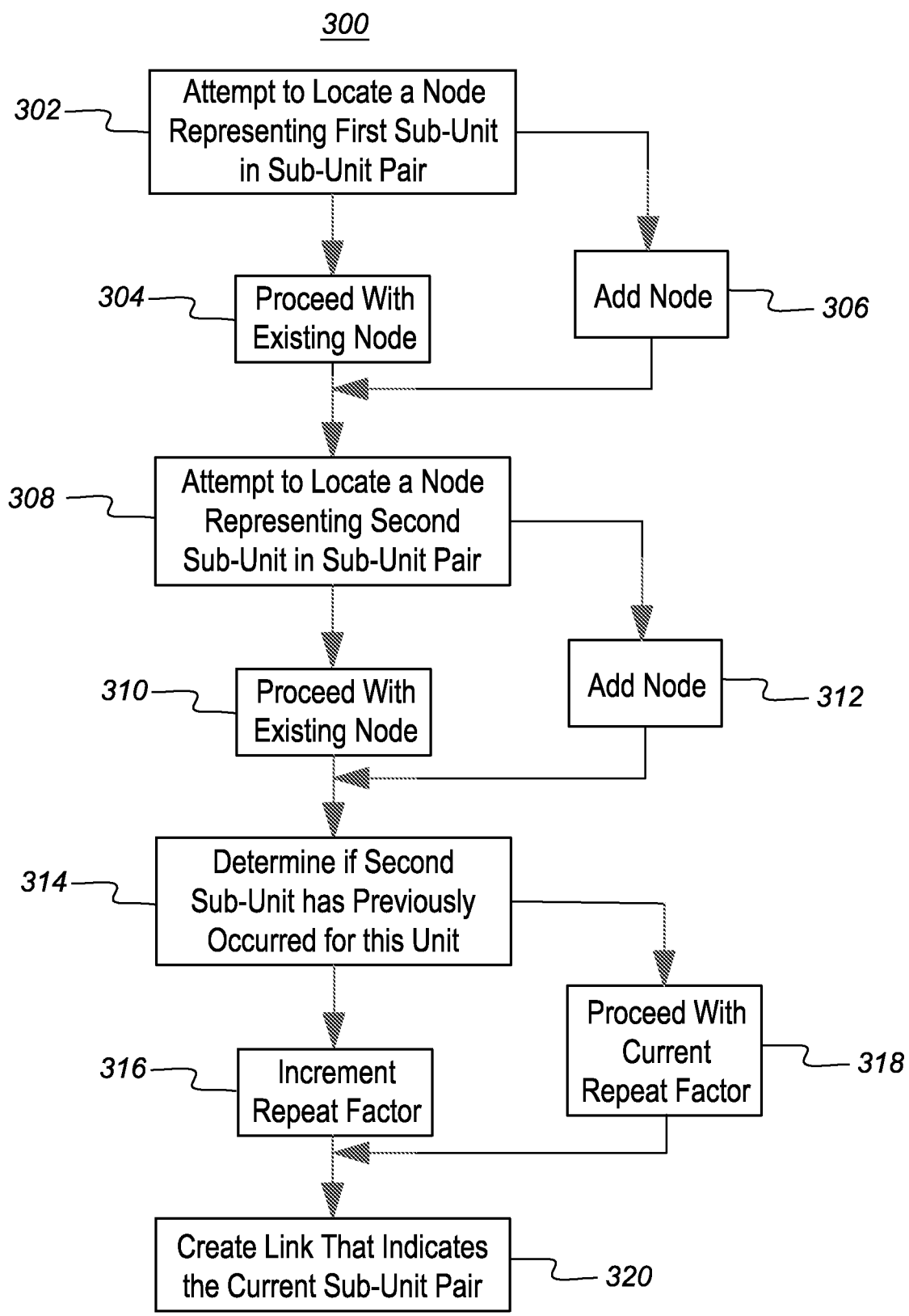
FIG. 3 illustrates an example of a method for processing a sub-unit pair of a subject text.

FIG. 3 illustrates an example of a method 300 for processing a sub-unit pair of a subject text. In at least one implementation, the sub-units will not only be individually stored, but their relationship to one another, and therefore their relationship to other sub-units, will also be mapped. For example, each sub-unit can point to the immediately subsequent sub-unit, as described below.

FIG. 3 shows that the method 300 can include attempting 302 to locate a node representing the first sub-unit in the sub-unit pair. In at least one implementation, the presence of a node indicates that the first sub-unit in the sub-unit pair has been previously encountered and the absence of a node indicates that the first sub-unit in the sub-unit pair has not been previously encountered. The node can be located using any desired search method. For example, the word graph can include an index of sub-units already stored. Additionally or alternatively, the word graph can be crawled, in an attempt to locate the first sub-unit. I.e., any desired method for searching the word graph is contemplated herein.

FIG. 3 also shows that the method 300 can include proceeding 304 with the existing node if the node is located 302. In at least one implementation, the same node can store the information for each use of the first sub-unit. I.e., the node can be reused for every instance of the first sub-unit (both within the current unit and within one or more other units). In each instance, the first sub-unit can be linked to the second sub-unit in the sub-unit pair, as described below.

FIG. 3 further shows that the method 300 can include adding 306 a node if the node is not located 302. In at least one implementation, adding 306 the node can include storing the first sub-unit in memory. Additionally or alternatively, adding 306 the node can include pointing to the first sub-unit in memory or otherwise indicating the existence of the first sub-unit.

FIG. 3 additionally shows that the method 300 can include attempting 308 to locate a node representing the second sub-unit in the sub-unit pair. In at least one implementation, the presence of a node indicates that the second sub-unit in the sub-unit pair has been previously encountered and the absence of a node indicates that the second sub-unit in the sub-unit pair has not been previously encountered. The node can be located using any desired search method. For example, the word graph can include an index of sub-units already stored. Additionally or alternatively, the word graph can be crawled, in an attempt to locate the second sub-unit. I.e., any desired method for searching the word graph is contemplated herein.

FIG. 3 also shows that the method 300 can include proceeding 310 with the existing node if the node is located 308. In at least one implementation, the same node can store the information for each use of the second sub-unit. I.e., the node can be reused for every instance of the second sub-unit (both within the current unit and within one or more other units). In each instance, the second sub-unit can be linked to the first sub-unit in the sub-unit pair, if desired.

FIG. 3 further shows that the method 300 can include adding 312 a node if the node is not located 308. In at least one implementation, adding 312 the node can include storing the second sub-unit in memory. Additionally or alternatively, adding 312 the node can include pointing to the second sub-unit in memory or otherwise indicating the existence of the second sub-unit.

FIG. 3 additionally shows that the method 300 can include determining 314 if the second sub-unit has previously occurred for this unit. In at least one implementation, each node can include a unit identifier which indicates which units contain the sub-units. I.e., each node can identify in which units the sub-unit has been located. Therefore, determining 314 if the second sub-unit has previously occurred for this unit can include checking the second node to determine if the current unit identifier is present in the second node.

FIG. 3 also shows that the method 300 can include incrementing 316 the repeat factor if the second sub-unit has previously occurred in this unit. In at least one implementation, the repeat factor indicates instances in which one or more repeated sub-units have been encountered in the unit. I.e., the repeat factor can indicate the total number of sub-unit repeats, although the sub-unit repeats may be different than one another. I.e., one or both of the sub-units near the second sub-unit can be different in the current occurrence than in previous occurrences.

FIG. 3 further shows that the method 300 can include proceeding 318 with the current repeat factor if the second sub-unit has not occurred in the current unit. In at least one implementation, the lack of a previous occurrence of the second sub-unit indicates that the second sub-unit is not being repeated within the unit. Therefore, the second sub-unit is not a repeat and the repeat factor does not need to be incremented.

FIG. 3 additionally shows that the method 300 can include creating 320 a link that indicates the current sub-unit pair. In at least one implementation, the link can be unique for each occurrence of the sub-unit pair. I.e., even if the sub-unit pair has previously been encountered in the unit, subsequent sub-units may be different and the link can reflect the relative occurrence of the sub-unit pair. Additionally or alternatively, the link can indicate the current repeat factor within the unit. I.e., the repeat factor can be saved within the link, which includes the relative occurrence of the second sub-unit.

Figure 4C:
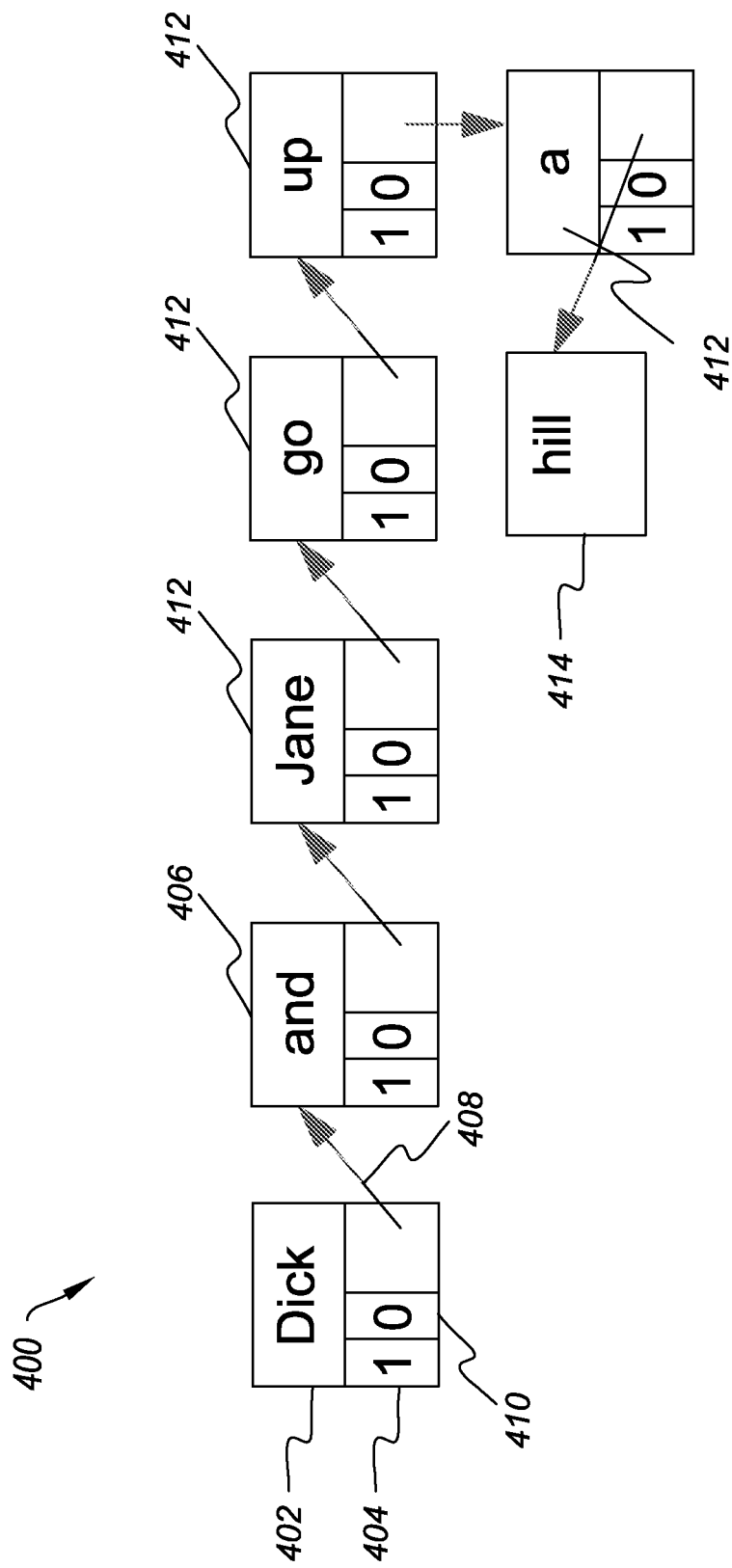
FIG. 4C illustrates an example of a complete unit in the word graph.

FIGS. 4A, 4B and 4C illustrate an example of adding a sentence to a word graph 400. FIG. 4A illustrates an example of adding the first word of a sentence to a word graph 400; FIG. 4B illustrates an example of adding the second word of the sentence to the word graph 400; and FIG. 4C illustrates an example of a complete sentence in the word graph 400. In at least one implementation, the word graph 400 can map each word in the sentence and the links between the words. The example shown in FIGS. 4A, 4B and 4C depicts the addition of the words in the sentence "Dick and Jane go up a hill" to the word graph 400; however, one of skill in the art will appreciate that the word graph 400 can be used for any sub-units in a unit, as defined above. I.e., one of skill in the art will appreciate that the use of words as sub-units and sentences as units in FIGS. 4A, 4B and 4C is exemplary and is not limiting herein.

FIG. 4A shows that the first word 402 is added to the word graph 400. In at least one implementation, the first word 402 is placed in a node, which becomes part of the word graph 400. The first word 402 can be linked to an index of first words. In particular, an index can be kept which lists the first word or each of the first words in the word graph 400. This can allow the evaluation of each sentence individually or of each of the sentences, or any portion thereof, to proceed through each sentence if so desired.

FIG. 4B shows that the first word 402 is given a sentence identifier 404. In at least one implementation, the sentence identifier 404 can indicate the sentence being evaluated. The sentence identifier 404 can include any identifier which provides the desired information about the sentence. For example, the sentence identifier 404 can include the number of the sentence in numerical order. Additionally or alternatively, the sentence identifier 404 can include information about the subject text (including authorship and/or other source information), the location of the sentence, the date and/or time the sentence was added to the word graph 400 or any other desired information.

FIG. 4B also shows that the second word 406 is added to the word graph 400. The second word can include the word immediately following the first word. In at least one implementation, the second word 406 is added to a second node which becomes part of the word graph 400.

FIG. 4B further shows that the word graph 400 can include a link 408 from the first word 402 to the second word 406. In at least one implementation, the link 408 shows that the second word 406 follows the first word 402 in the sentence. In different sentences the word order can be different or the first word 402 or the second word 406 can be different, so the link 408 shows the relationship between the two words in the sentence for analysis.

FIG. 4B additionally shows that the word graph 400 can include the repeat factor 410 for the current sentence. In at least one implementation, the repeat factor 410 can show the number of instances in which one or more repeated words have been encountered in the sentence. I.e., the repeat factor allows the word graph 400 to show which instance is occurring of a word which may be repeated in the sentence, as described above.

FIG. 4C shows that the word graph can include subsequent words 412. In at least one implementation, each subsequent word 412 can include a link 408 which shows the next word in the sentence. I.e., each subsequent word 412 is pointed to by the preceding word and points to the next word. Additionally or alternatively, each subsequent word 412 can include the repeat factor 410.

FIG. 4C also shows that the word graph 400 can include a final word 414. In at least one implementation, the final word 414 can lack a pointer. I.e., the lack of a link to another word can indicate that the final word 414 is the last word in the sentence. Additionally or alternatively, the final word 414 can include a tag or other indicator that it is the last word. The repeat factor 410 can be omitted from the last word 414 since there is no danger of following the wrong trail without a pointer. I.e., the lack of a link 408 can render the use of the repeat factor 410 moot.

Figure 5A:
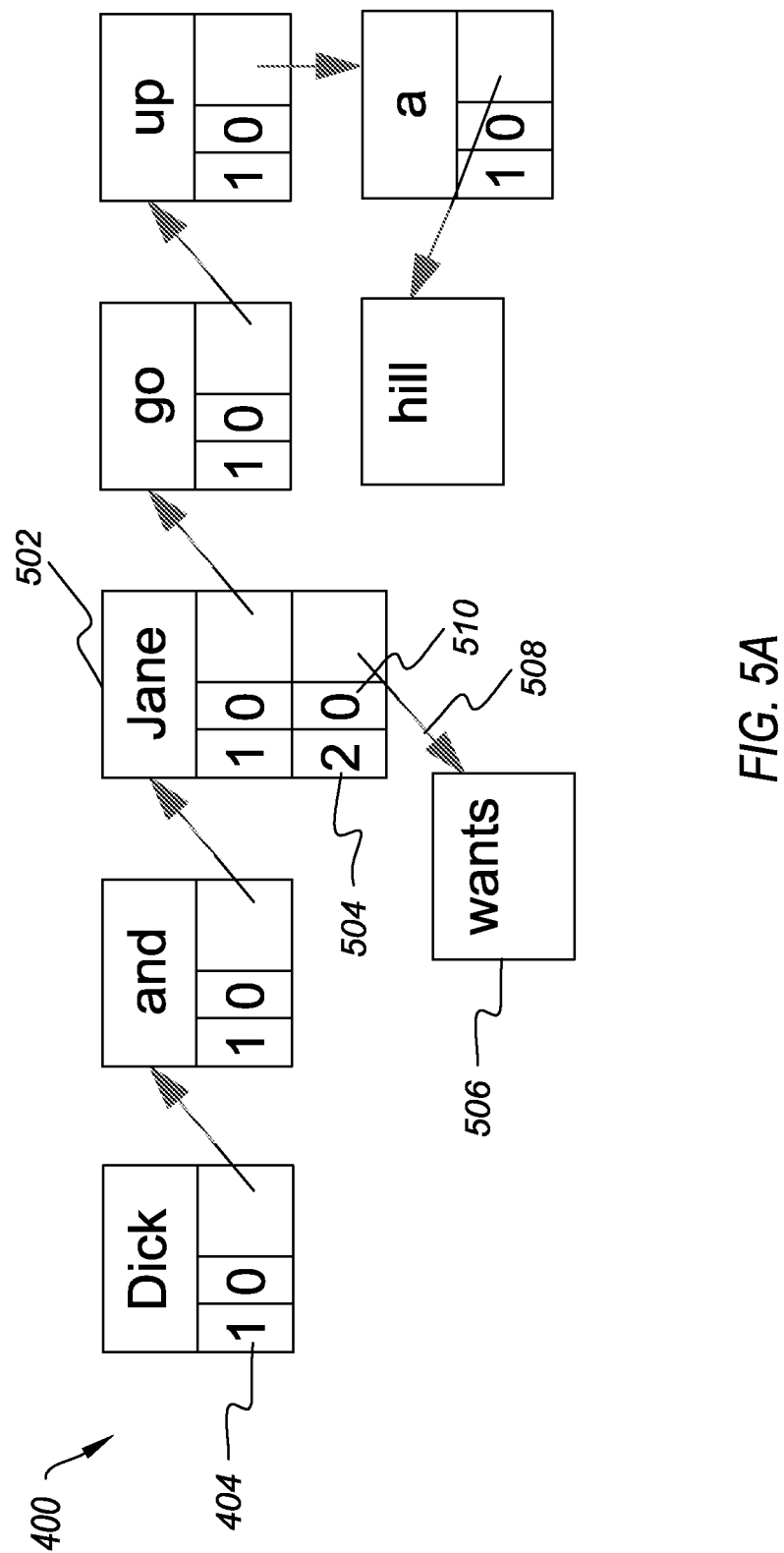
FIG. 5A illustrates an example of adding a second unit to the word graph while in process.
Figure 5B:
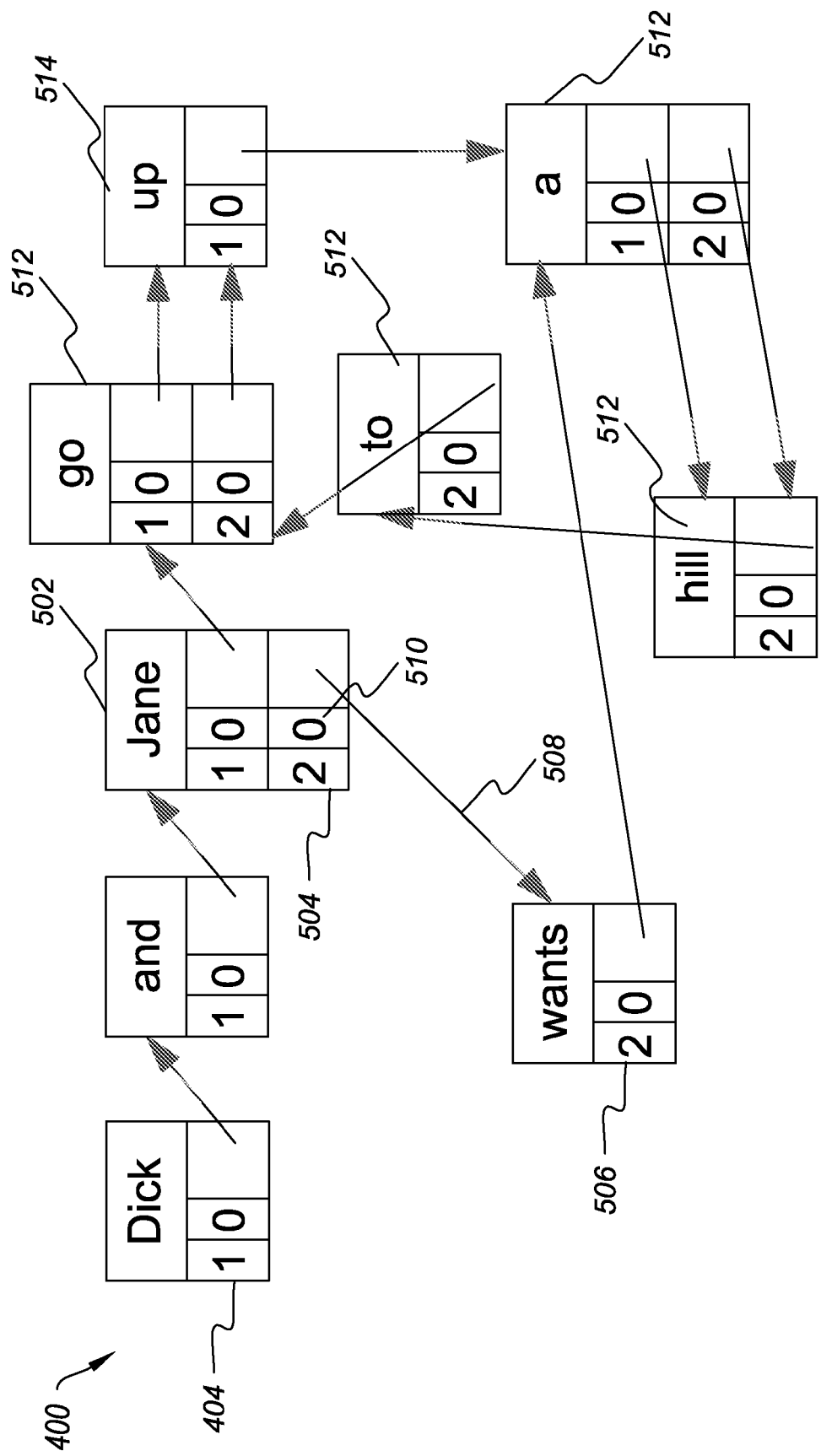
FIG. 5B illustrates an example of adding a complete second unit to the word graph.

FIGS. 5A and 5B illustrate an example of adding a second sentence to a word graph 400. FIG. 5A illustrates an example of adding the second sentence to the word graph 400 while in process; and FIG. 5B illustrates an example of adding a complete second sentence to the word graph 400. In at least one implementation, adding the second sentence can use nodes already existing in the word graph 400 if available. I.e., once a node has been created in any sentence, it can be used to show the presence of the word in other sentences (or later within the same sentence), as described below. The example shown in FIGS. 5A and 5B depicts the addition of the sentence "Jane wants a hill to go up" to the word graph 400; however, one of skill in the art will appreciate that the word graph 400 can be used for any sub-units in a unit, as defined above. I.e., one of skill in the art will appreciate that the use of words as sub-units and sentences as units in FIGS. 5A and 5B is exemplary and is not limiting herein.

FIG. 5A shows that the word graph 400 can include a first word 502 of the second sentence. In at least one implementation, the first word 502 can be placed in a node, which becomes part of the word graph 400. If the first word 502 is a word that occurred in an earlier sentence, then the node from the earlier sentence can be used. Additionally or alternatively, if the first word 502 did not occur in an earlier sentence, then a new node can be created for the first word 502. In the example shown, the first word 502 occurred in the first sentence so the node can be reused. If an index is kept which lists the first word or each of the first words in the word graph 400 the first word 502 can be added to the index.

FIG. 5A also shows that the first word 502 is given a sentence identifier 504. In at least one implementation, the sentence identifier 504 can indicate the sentence being evaluated. In particular, the sentence identifier 504 can be different than the sentence identifier 404 which identifies the first sentence. The sentence identifier 504 can include any identifier which provides the desired information about the sentence. For example, the sentence identifier 504 can include the sentence in numerical order. Additionally or alternatively, the sentence identifier 504 can include information about the subject text, the location of the sentence, the date and/or time the sentence was added to the word graph 400 or any other desired information (including authorship and/or other source information).

FIG. 5A further shows that a second word 506 can be added to the word graph 400. In at least one implementation, the second word 506 can be placed in a node, which becomes part of the word graph 400. If the second word 506 is a word that occurred in an earlier sentence (or earlier in the same sentence), then the node from the earlier sentence (or earlier in the same sentence) can be used. Additionally or alternatively, if the second word 506 did not occur in an earlier sentence (or earlier in the same sentence), then a new node can be created for the second word 506.

FIG. 5A additionally shows that the word graph 400 can include a link 508 from the first word 502 to the second word 506. In at least one implementation, the link 508 shows that the second word 506 follows the first word 502 in the second sentence. In different sentences the word order can be different or the first word 502 or the second word 506 can be different, so the link 508 shows the relationship between the two words in the second sentence for analysis. The link 508 can be associated with the second sentence identifier 506 to distinguish the use of the first word 502 in the second sentence from the use of the first word 502 in the first sentence.

FIG. 5A additionally shows that the word graph 400 can include the repeat factor 510 for the second sentence. In at least one implementation, the repeat factor 510 can show the number of instances in which one or more repeated words have been encountered in the second sentence. I.e., the repeat factor allows the word graph 400 to show which instance is occurring of a word which may be repeated in the second sentence, as described above.

FIG. 5B shows that the word graph can include subsequent words 512. In at least one implementation, each subsequent word 512 can include a link which shows the next word in the sentence. I.e., each subsequent word 512 is pointed to by the preceding word and points to the next word. The subsequent words 512 can be placed in new nodes or existing nodes as needed.

FIG. 5B also shows that the word graph 400 can include a final word 514. In at least one implementation, the final word 514 can lack a pointer. I.e., the lack of a link 508 to another word can indicate that the final word 514 is the last word in the sentence. Additionally or alternatively, the final word 514 can include a tag or other indicator that it is the last word. The repeat factor 510 can be omitted from the last word 514 since there is no danger of following the wrong trail without a pointer. I.e., the lack of a link 508 can render the use of the repeat factor 510 moot.

Figure 6:
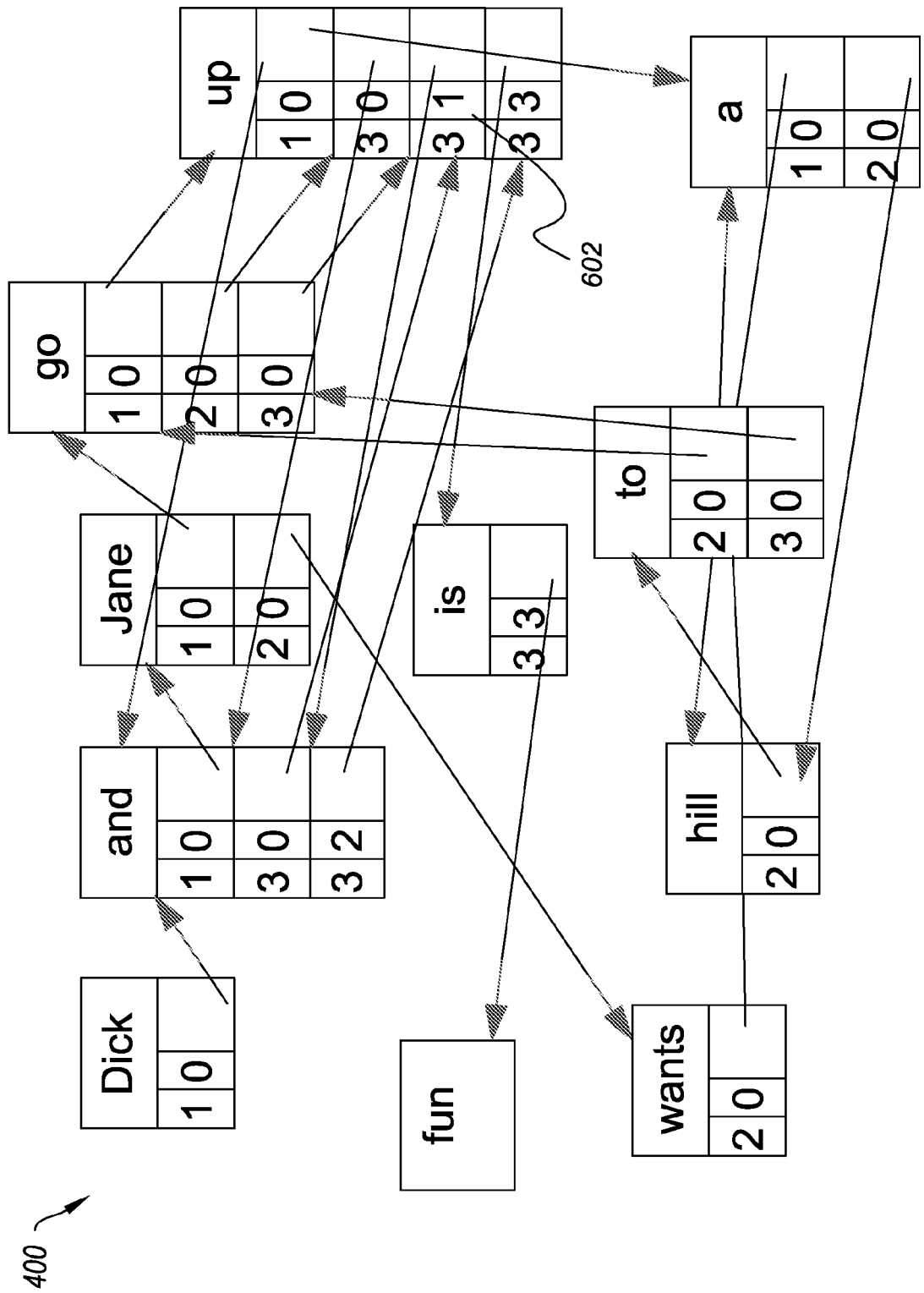
FIG. 6 illustrates an example of adding a complete third unit to a word graph.

FIG. 6 illustrates an example of adding a complete third sentence to a word graph 400. In at least one implementation, adding the third sentence can use nodes already existing in the word graph 400 if available. I.e., once a node has been created in any sentence, it can be used to show the presence of the word in other sentences (or later within the same sentence), as described below. The example shown in FIG. 6 shows the addition of the sentence "To go up and up and up is fun" to the word graph 400; however, one of skill in the art will appreciate that the word graph 400 can be used for any sub-units in a unit, as defined above. I.e., one of skill in the art will appreciate that the use of words as sub-units and sentences as units in FIG. 6 is exemplary and is not limiting herein.

FIG. 6 shows that the repeat factor 602 of the third sentence is incremented when a word is repeated. In at least one implementation the repeat factor 602 is incremented each time a repeated word is encountered. This incremented repeat factor is applied to subsequent words in the sentence, whether or not they are themselves repeated. For example, the word "up" occurs three times in the sentence. After the first instance of "and" is added to the word graph 400 the word "up" occurs for the second time. Therefore, the second instance of the word "up" causes the repeat factor 602 to become 1 because the repeat factor 602 has been incremented. In addition, after the second instance of "up" is added to the word graph 400, the word "and" occurs for the second time. Therefore, the second instance of the word "and" causes the repeat factor 602 to become 2 because the repeat factor 602 has been incremented. This continues throughout the sentence.

Figure 7:
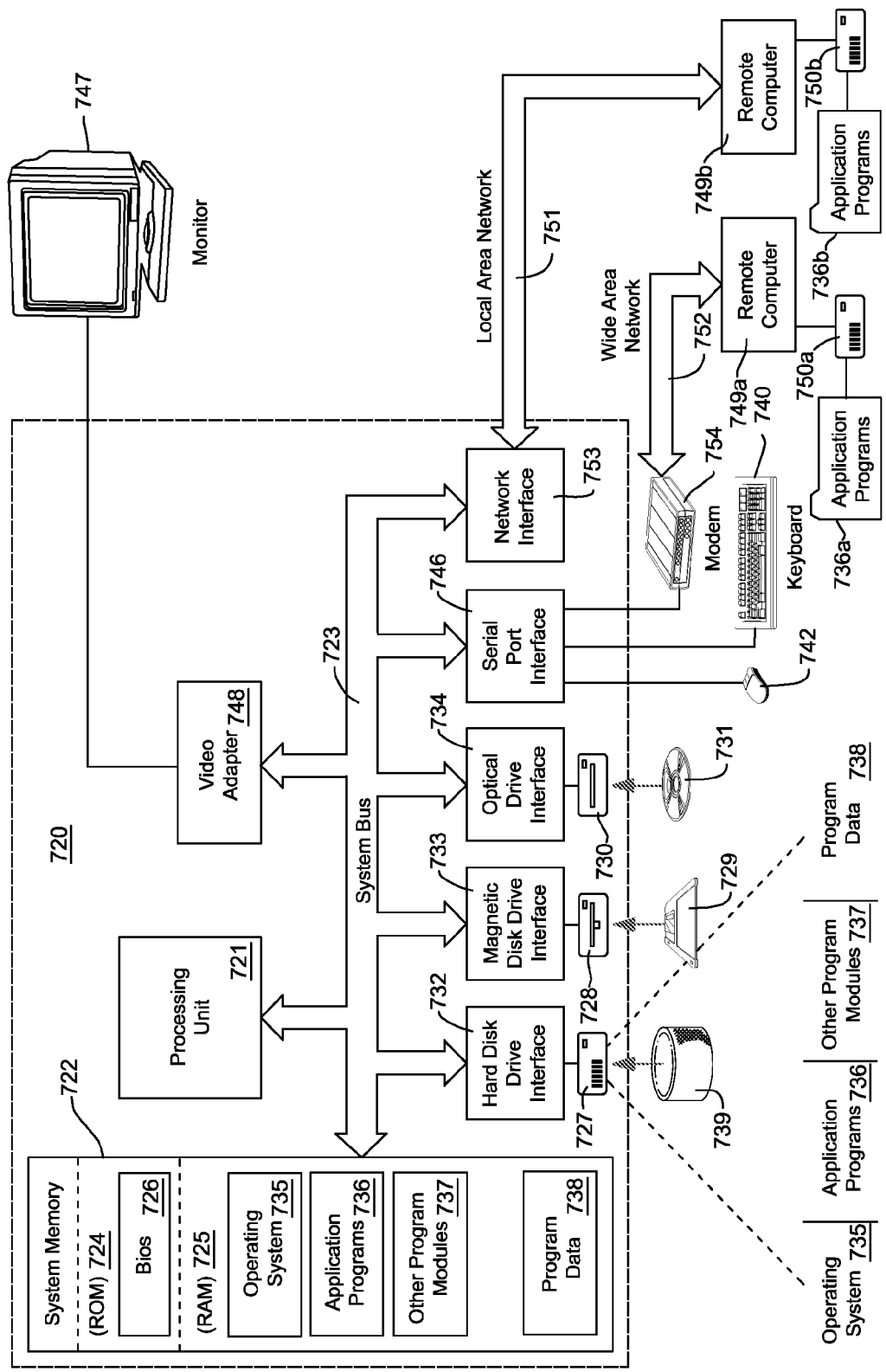
FIG. 7 illustrates an example of a suitable computing environment in which the invention may be implemented.

FIG. 7, and the following discussion, are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

One skilled in the art will appreciate that the invention may be practiced in network computing environments with many types of computer system configurations, including personal computers, hand-held devices, mobile phones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 7, an example system for implementing the invention includes a general purpose computing device in the form of a conventional computer 720, including a processing unit 721, a system memory 722, and a system bus 723 that couples various system components including the system memory 722 to the processing unit 721. It should be noted, however, that as mobile phones become more sophisticated, mobile phones are beginning to incorporate many of the components illustrated for conventional computer 720. Accordingly, with relatively minor adjustments, mostly with respect to input/output devices, the description of conventional computer 720 applies equally to mobile phones. The system bus 723 may be any of several types of bus structures including a memory bus or memory controller, a peripheral bus, and a local bus using any of a variety of bus architectures. The system memory includes read only memory (ROM) 724 and random access memory (RAM) 725. A basic input/output system (BIOS) 726, containing the basic routines that help transfer information between elements within the computer 720, such as during start-up, may be stored in ROM 724.

The computer 720 may also include a magnetic hard disk drive 727 for reading from and writing to a magnetic hard disk 739, a magnetic disk drive 728 for reading from or writing to a removable magnetic disk 729, and an optical disc drive 730 for reading from or writing to a removable optical disc 731 such as a CD-ROM or other optical media. The magnetic hard disk drive 727, magnetic disk drive 728, and optical disc drive 730 are connected to the system bus 723 by a hard disk drive interface 732, a magnetic disk drive-interface 733, and an optical drive interface 734, respectively. The drives and their associated computer-readable media provide nonvolatile storage of computer-executable instructions, data structures, program modules and other data for the computer 720. Although the exemplary environment described herein employs a magnetic hard disk 739, a removable magnetic disk 729 and a removable optical disc 731, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 739, magnetic disk 729, optical disc 731, ROM 724 or RAM 725, including an operating system 735, one or more application programs 736, other program modules 737, and program data 738. A user may enter commands and information into the computer 720 through keyboard 740, pointing device 742, or other input devices (not shown), such as a microphone, joy stick, game pad, satellite dish, scanner, or the like. These and other input devices are often connected to the processing unit 721 through a serial port interface 746 coupled to system bus 723. Alternatively, the input devices may be connected by other interfaces, such as a parallel port, a game port or a universal serial bus (USB). A monitor 747 or another display device is also connected to system bus 723 via an interface, such as video adapter 748. In addition to the monitor, personal computers typically include other peripheral output devices (not shown), such as speakers and printers.

The computer 720 may operate in a networked environment using logical connections to one or more remote computers, such as remote computers 749a and 749b. Remote computers 749a and 749b may each be another personal computer, a server, a router, a network PC, a peer device or other common network node, and typically include many or all of the elements described above relative to the computer 720, although only memory storage devices 750a and 750b and their associated application programs 736a and 736b have been illustrated in FIG. 7. The logical connections depicted in FIG. 7 include a local area network (LAN) 751 and a wide area network (WAN) 752 that are presented here by way of example and not limitation. Such networking environments are commonplace in office-wide or enterprise-wide computer networks, intranets and the Internet.

When used in a LAN networking environment, the computer 720 can be connected to the local network 751 through a network interface or adapter 753. When used in a WAN networking environment, the computer 720 may include a modem 754, a wireless link, or other means for establishing communications over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are exemplary and other means of establishing communications over wide area network 752 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for constructing a word graph, the method comprising:
    obtaining a subject text;
    dividing the subject text into one or more units;
    dividing the units into one or more sub-units; and
    recording each of the one or more sub-units, wherein recording each of the one or more sub-units includes:
        determining whether each sub-unit has been previously encountered;
        storing the sub-unit as a node if the sub-unit has not been previously encountered;
        proceeding with an existing node if the sub-unit has been previously encountered;
        preserving a relationship of each of the one or more units to one another; and
        preserving a relationship of each of the one or more sub-units to one another;
    storing a repeat factor, wherein the repeat factor indicates a number of instances in which one or more repeated sub-units have been encountered since some prior point in each of the one or more units;
    incrementing the repeat factor each time a repeated sub-unit is encountered since some prior point in each of the one or more units; and
    preserving and analyzing the relationship of each of the one or more sub-units to one another to perform a function as directed by a user, wherein the function includes comparing the constructed word graph to a user input; and
    outputting a result of the function to the user.

2. The method of claim 1, wherein at least one of the one or more units points to a subsequent unit.

3. The method of claim 1, wherein preserving the relationship of each of the one or more sub-units to one another includes saving an order of the sub-units.

4. The method of claim 3, wherein the at least one of the one or more sub-units points to a subsequent sub-unit.

5. The method of claim 4, wherein pointing to subsequent sub-units includes pointing to a location of the sub-unit in memory.

6. The method of claim 1 further comprising:
    creating an index, wherein the index points to the first sub-unit in each of the one or more units.

7. The method of claim 1 further comprising:
    assigning an identifier to at least one of the one or more units.

8. The method of claim 7, wherein the identifier includes at least one of:
    authorship; or
    source information with respect to each of the one or more units.

9. The method of claim 1 further comprising:
    identifying the first sub-unit in at least one of the units;
    navigating through each of the sub-units of the unit.

10. The method of claim 1, wherein at least one of the one or more units is a sentence.

11. The method of claim 1, wherein at least one of the one or more units is one of:
    a chapter;
    a section;
    a paragraph;
    a phrase;
    a word;
    a line;
    a class of word;
    a phrase type; or
    a part of speech.

12. The method of claim 1, wherein at least one of the one or more sub-units is a word.

13. The method of claim 1, wherein at least one of the one or more sub-units is one of:
    a chapter;
    a section;
    a paragraph;
    a sentence;
    a phrase;
    a line;
    a class of word;
    a phrase type;
    a part of speech;
    a morpheme;
    a syllable;
    a punctuation mark;
    a number;
    a character; or
    a symbol.

14. A method for producing a word graph, the method comprising:
    receiving a subject text;
    dividing the subject text into one or more sentences;
    assigning an identifier to each of the one or more sentences, wherein the identifier:
        is unique for each of the one or more sentences;
        identifies an occurrence of each of the one or more sentences within the subject text; and
        records a position of the one or more sentences relative to one another;
    dividing the each of the one or more sentences into one or more words;
    processing the words, wherein processing the words includes:
        determining whether each word has been previously encountered;
        storing word as a node if the word has not been previously encountered;
        proceeding with an existing node if the word has been previously encountered;
        identifying the first word in each of the one or more sentences in a first word index; and
        determining the relative placement of each word in each of the one or more sentences;
    storing a repeat factor, wherein the repeat factor indicates a number of instances in which one or more repeated words have been encountered since some prior point in each of the one or more sentences;

incrementing the repeat factor each time a repeated word is encountered since some prior point in each of the one or more sentences;

preserving and analyzing the relationship of each of the one or more words to one another to perform a function as directed by a user, wherein the function includes comparing the created word graph to a user input; and outputting a result of the function to the user.

15. The method of claim 14, wherein processing the words further includes storing each word in a node.

16. The method of claim 15, wherein each node points to the node of the immediately following word in the sentence if such a word exists.

17. The method of claim 1, wherein the function includes at least one of:

text search using example unit comparison;

automated proof-reading using example unit comparison;

improved blackline comparison using example unit comparison;

next sub-unit and rest of unit prediction using example unit comparison;

predictive drafting assistance through next sub-unit prediction and rest of unit prediction; or increasing accuracy of speech recognition through next sub-unit prediction and rest of unit prediction.

18. The method of claim 17, wherein the repeat factor is stored in at least one node.

19. In a computing system, a non-transitory computer-readable storage medium including instructions that, when executed by a computing device, cause the computing device to create a word graph for storing a subject text, wherein the subject text is divided into sentences and the sentences are further divided into words by performing the steps:

receiving a subject text;

creating one or more nodes, wherein each of the one or more nodes:

includes a word from the subject text;

creating a repeat factor, wherein the repeat factor indicates the number instances in which one or more repeated words have been encountered since some prior point in a sentence of the subject text;

assigning a sentence identifier, wherein the sentence identifier:

identifies the sentence in the subject text; and records a position of the one or more sentences relative to one another;

assigning a link between two words, wherein:

the two words include:

a first node storing a first word; and a second node storing a second word, wherein the second word is the word immediately following the first word in at least one location in the subject text; and the link points from the first node to the second node;

preserving and analyzing the relationship of each of the one or more words to one another to perform a function as directed by a user, wherein the function includes comparing the created word graph to a user input; and outputting a result of the function to the user.

20. The computer-readable storage medium of claim 19 further comprising creating a first word index, wherein the first word index includes the first word of the sentence.

* * * * *